(12) United States Patent
Herzog

(10) Patent No.: US 6,826,444 B2
(45) Date of Patent: Nov. 30, 2004

(54) METHOD AND APPARATUS FOR FILLING CONTAINERS WITH PIECE GOODS

(75) Inventor: Florian Herzog, Zürich (CH)

(73) Assignee: Robert Bosch GmbH (DE)

(*) Notice: Subject to any disclaimer, the term of this patent is extended or adjusted under 35 U.S.C. 154(b) by 0 days.

(21) Appl. No.: 10/215,515

(22) Filed: Aug. 8, 2002

(65) Prior Publication Data
US 2003/0037515 A1 Feb. 27, 2003

(30) Foreign Application Priority Data
Aug. 22, 2001 (CH) .............................................. 1551/01

(51) Int. Cl.$^7$ ................................................ G06F 7/00
(52) U.S. Cl. ........................ 700/213; 700/248; 198/395
(58) Field of Search ............................... 700/213, 228, 700/230, 245, 248, 259; 198/395

(56) References Cited

U.S. PATENT DOCUMENTS

| | | | | |
|---|---|---|---|---|
| 4,294,057 A | * | 10/1981 | Winiasz et al. ................ | 53/244 |
| 4,355,936 A | * | 10/1982 | Thomas et al. ........... | 414/796.2 |
| 4,503,507 A | * | 3/1985 | Takeda et al. .............. | 700/249 |
| H000320 H | * | 8/1987 | Reuter ......................... | 700/112 |
| 5,040,056 A | * | 8/1991 | Sager et al. .................. | 348/88 |
| 5,121,589 A | * | 6/1992 | Ventura et al. ................ | 53/448 |
| 5,186,599 A | | 2/1993 | Fluck | |
| 5,456,563 A | * | 10/1995 | Halbo .................... | 414/416.06 |
| 5,553,442 A | * | 9/1996 | Fadaie ......................... | 53/445 |
| 5,586,387 A | * | 12/1996 | Nakatani et al. .............. | 29/703 |
| 5,636,726 A | * | 6/1997 | Nield ......................... | 198/430 |
| 6,002,125 A | | 12/1999 | Schubert | |
| 6,011,998 A | | 1/2000 | Lichti et al. | |
| 6,122,895 A | * | 9/2000 | Schubert ........................ | 53/55 |
| 6,256,868 B1 | * | 7/2001 | Sugito et al. ................. | 29/711 |
| 6,360,142 B1 | * | 3/2002 | Miura et al. ................ | 700/245 |

FOREIGN PATENT DOCUMENTS

| | | |
|---|---|---|
| DE | 42 08 818 A1 | 9/1993 |
| EP | 0 250 470 | 12/1986 |
| EP | 0 856 465 A1 | 8/1998 |

OTHER PUBLICATIONS

Eurpoean Search Report, EP Application No. 02405691.3–2308–.

* cited by examiner

Primary Examiner—Khoi H. Tran
(74) Attorney, Agent, or Firm—Harness, Dickey & Pierce, P.L.C.

(57) ABSTRACT

In a method of filling containers with piece goods, the piece goods are fed on a feed conveyer to at least two robots arranged in the conveying direction, in order by means of these robots to be put into empty spaces in the containers conveyed on a container conveyer. In the process, the robots are controlled in accordance with the arrangement of the piece goods on the feed conveyer, in such a way that they are utilized at least approximately uniformly. As a result, the lifetime of the robots may be increased.

5 Claims, 4 Drawing Sheets

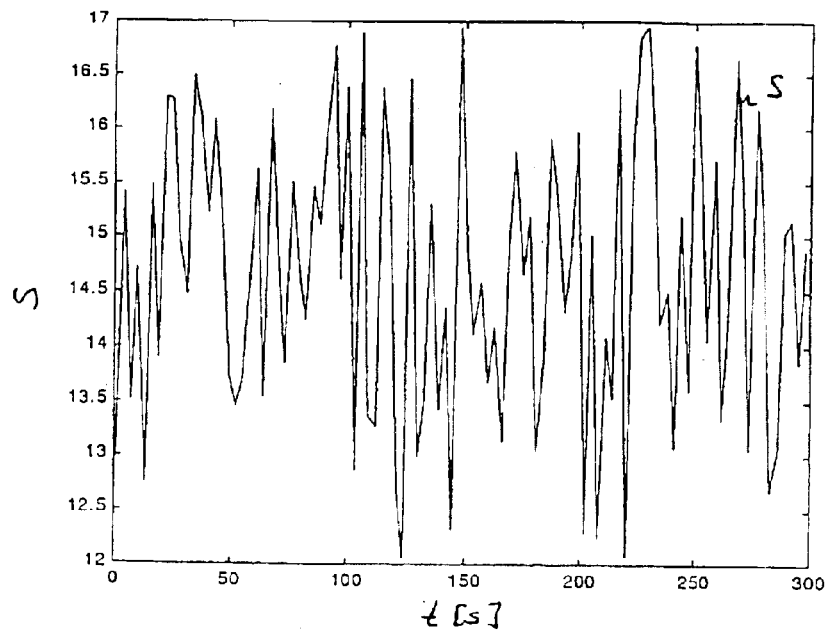
Fig. 2
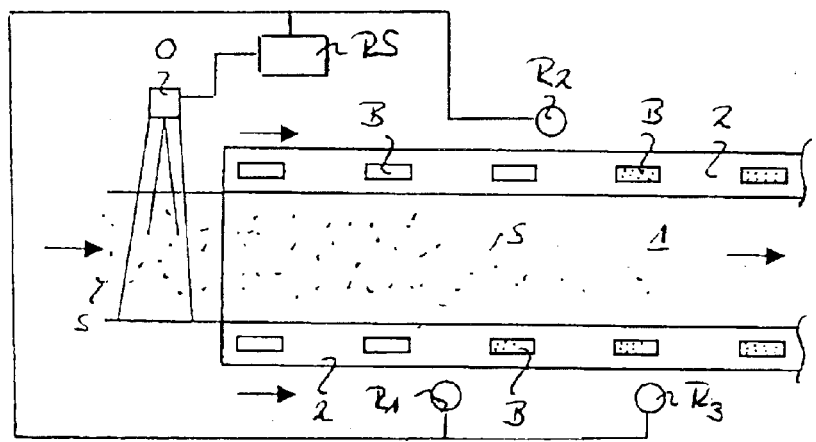
Fig. 3
Fig. 5
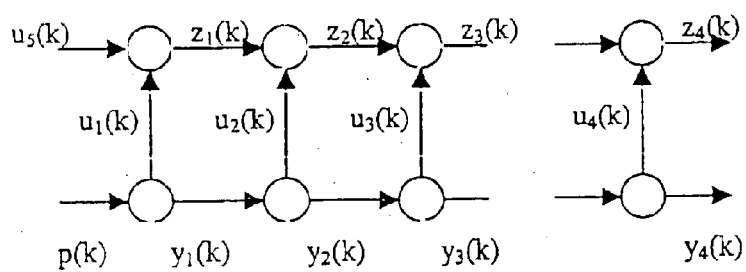

METHOD AND APPARATUS FOR FILLING CONTAINERS WITH PIECE GOODS

TECHNICAL FIELD

The invention relates to a method and an apparatus for filling containers with piece goods.

PRIOR ART

For packaging systems, it is known to put piece goods, which are delivered to a packaging station via feed conveyors, into containers by means of robots. EP-A-0 250 470 discloses robots of this type, also referred to as pickers, which are suitable for use in packaging lines. What is concerned here is a robot arm with a base element, to which an operating part is attached via three two-part arms and on which in turn grippers or suction elements are arranged.

Primarily when the piece goods are supplied with irregular spacing and unordered, optical detection systems are used in order to register the position and alignment of the individual piece goods on the feed conveyor, as disclosed in U.S. Pat. No. 5,186,599, for example. This data is transmitted to a robot control system, which controls the individual robots appropriately in order to put as many of the piece goods as possible into the container. In the process, the first robot in the conveying direction will grip as many piece goods as possible and the following robots will attempt to remove the remainder from the feed conveyor.

However, this leads to the individual robots being utilized to different extents. The first robot in the conveying direction has a higher operating loading than the last in the series. In addition, all the robots are subjected to wide output fluctuations, as can be seen from FIG. 1. This illustrates the number of products which are gripped per second by a robot. These values are indicated for a total of four robots, the individual robots being numbered in the conveying direction. This means that robot number 1 is the first robot in the conveying direction. As can be seen in FIG. 1, the first two robots always operate at their maximum output limit. The third robot frequently reaches its output limit, but also exhibits wide fluctuations in the operating loading. The fourth robot, by contrast, is hardly utilized, but is subject to massive output fluctuations.

This distribution of the operating loading has the disadvantage that robots which always operate at their output limit or which are subjected to wide fluctuation have a shortened lifetime because of the high mechanical stress.

SUMMARY OF THE INVENTION

It is therefore an object of the invention to specify a method and an apparatus which increases the lifetime of the individual robots.

This object is achieved by a method and an apparatus having the features of patent claim 1 and 7, respectively.

According to the invention, the robots are driven in such a way that all the robots are utilized as uniformly as possible over time and are not subjected to any wide output fluctuations. This leads to all the robots being in at least approximately the same output range, the output range lying underneath a maximum output range. In a preferred variant of the method, not only are the robots driven appropriately, but the speed of the container conveyor is also controlled.

Further advantageous embodiments emerge from the dependent patent claims.

BRIEF DESCRIPTION OF THE DRAWINGS

In the following text, the subject matter of the invention will be explained by using a preferred exemplary embodiment, which is illustrated in the attached drawings, in which:

FIG. 2 shows a graphical representation of a product stream as a function of time;

FIG. 3 shows a schematic representation of a packaging system having a feed conveyer and a plurality of robots;

FIG. 5 shows a schematic representation of a model on which the method according to the invention is based and FIG. 6 shows a graphical representation of the time loading of a robot system according to the invention.

WAYS OF IMPLEMENTING THE INVENTION

Figure 1:
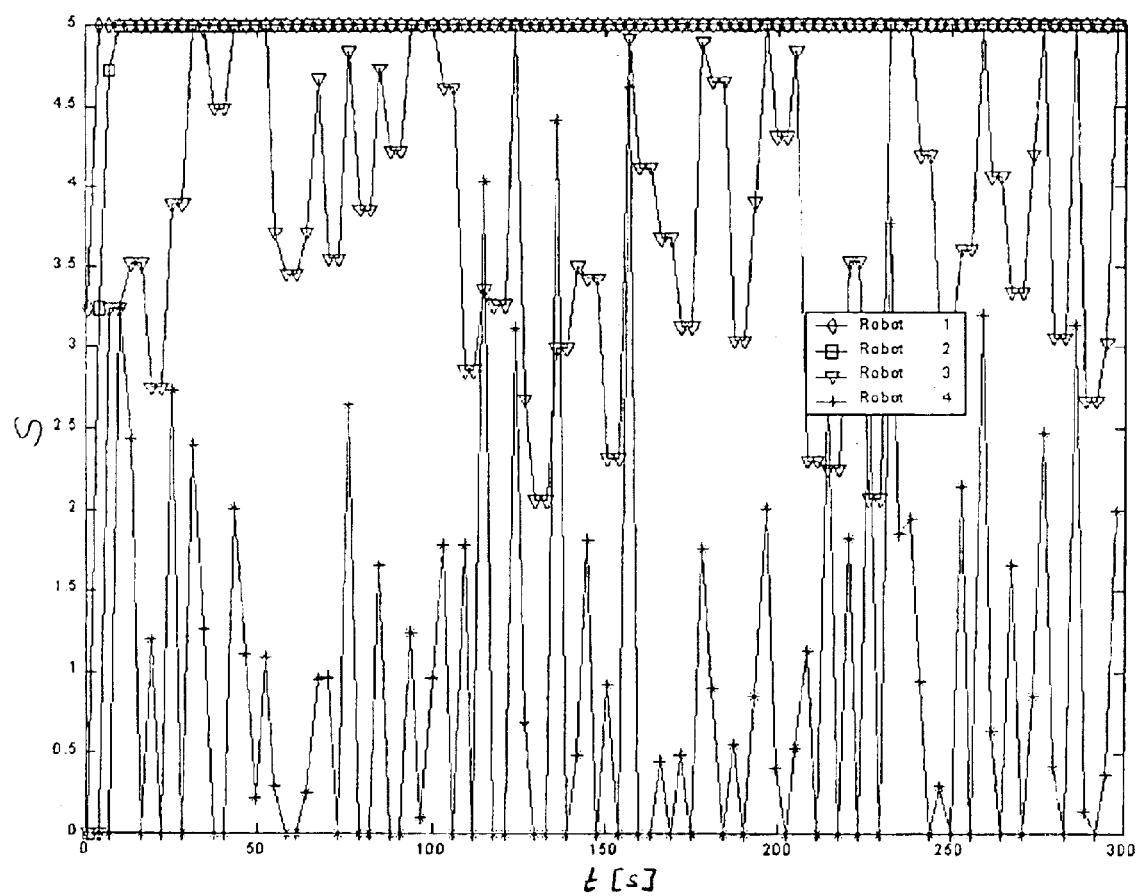
FIG. 1 shows a graphical representation of the time loading of a robot system according to the prior art.

FIG. 2 illustrates a product stream of piece goods S, such as typically occurs on a feed conveyer 1 of a packaging system. The product stream exhibits wide fluctuations over time. The piece goods S can be conveyed in an ordered or unordered manner.

As FIG. 3 illustrates, the piece goods S can be gripped by robots R1, R2, R3 arranged in the conveying direction and deposited in containers B, which are likewise transported on a conveyer, a container conveyer 2. Three robots are illustrated here. However, the method according to the invention is suitable for robot systems having 2 to n robots, n being a natural number. In this case, these are preferably the picker robots mentioned at the beginning.

FIG. 3 illustrates conveyance on the cocurrent principle. This means that the containers B move in the same direction as the piece goods S. However, the method according to the invention can also be used in packaging systems which have a counter current, a cross current or another type of conveyance of the piece goods S and the containers B.

In the method according to the invention, the objective is followed of filling all the containers B completely, but in the process loading the robots R1 to R3 or Rn as uniformly as possible over time. In this case, filling the containers B has the first priority, clearing all the piece goods S from the feed conveyer has the second priority.

In order to control the robots R1 to Rn, a robot control system RS has to know the state of the system before each calculation time. For this purpose, there is an optical detection system O upstream of the robots R1 to Rn in the conveying direction, which detects the position and alignment of the individual piece goods and forwards this data to the robot control system RS as state variables. Further state variables which are taken into account by the robot control system RS are the speed of the feed conveyer 1 and the dynamic behavior of the stream of holes. The holes are the number of free spaces to be filled in the containers B. The dynamic behavior contains both the number and the speed of movement on the container conveyer 2. All these state variables are measured before the calculation of the area of use of the individual robots. Furthermore, the robot control system has information relating to the individual robots, such as their maximum loading capacity and their fitness for use. The speed of the container conveyer 2 is also present as a control variable.

In the method according to the invention, the current robot output and, preferably, also the speed of the container conveyer is calculated in such a way that the following secondary conditions are fulfilled:

the output of each robot must be less than or equal to the maximum output;

the output of each robot must be less than or equal to the product stream before the respective area of use, the so-called robot cell;

the robot output must not lead to robots attempting to pack more piece goods than there are free spaces in a container;

the minimum robot output must be such that the following robot cells still fill the remaining empty spaces in the containers;

the output of the first and of the last robot cell and the speed of the container belt must be such that all the containers are filled and the output of the first and of the last robot cell must be such that the following robot cells as far as possible manage a large part of the remaining product stream.

Figure 4:
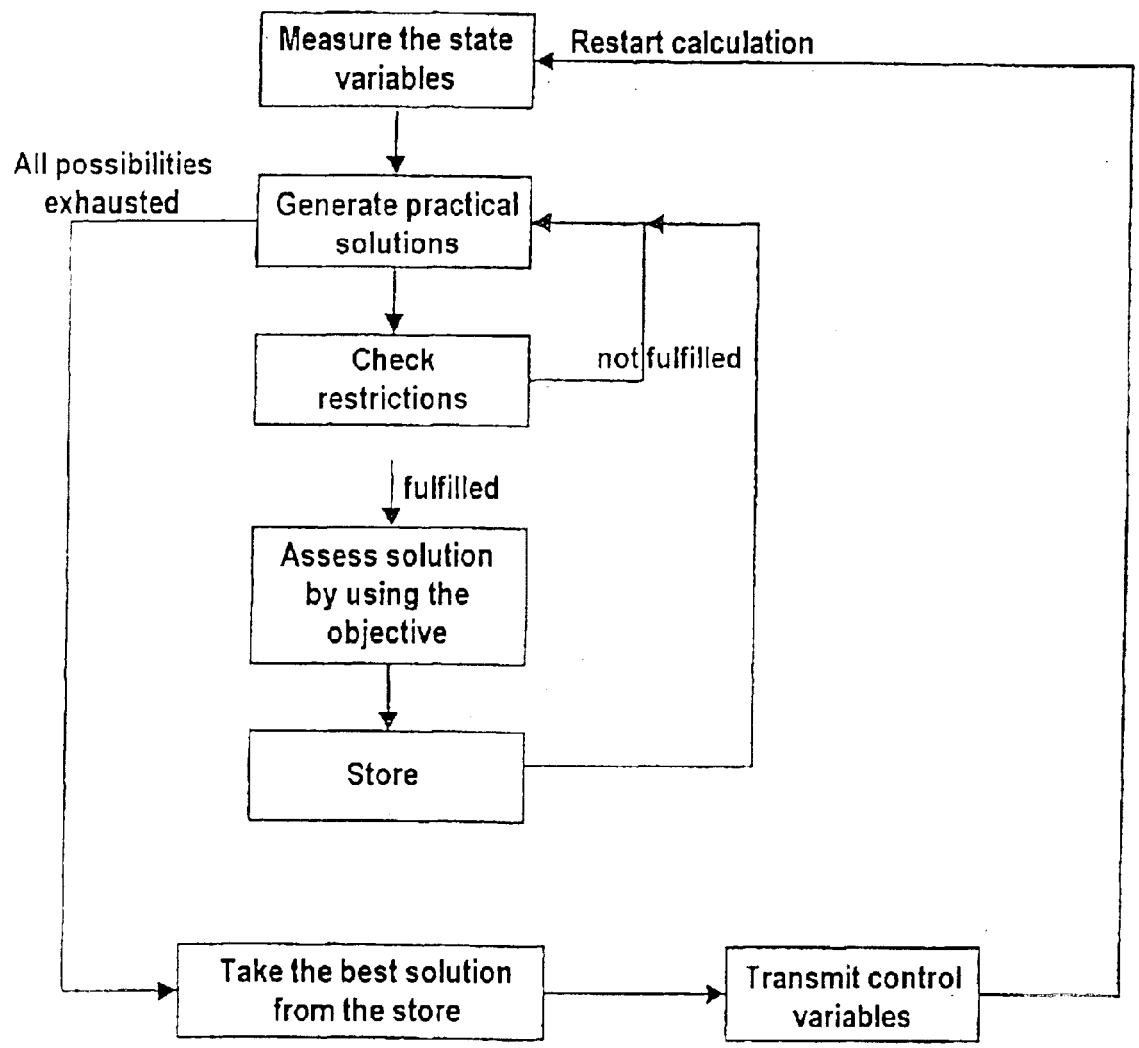
FIG. 4 shows a flowchart of the method according to the invention.

The set of all physically practical solutions is restricted by the abovementioned secondary conditions. Of course, still further secondary conditions could be formulated. By using FIG. 4, it can be seen how the robot control system generates solutions and tests whether these fulfill the abovementioned secondary conditions. Those solutions which fulfill the secondary conditions are assessed, taking the abovementioned objective into account, and are assigned a ranking. After all the practical solutions have been generated, those are selected which best fulfill the preset objectives, that is to say which fill the containers most completely but load the robots most uniformly.

The method according to the invention operates with time units, the steps listed below being carried out within one unit. The control variables from the last time unit are stored in order to calculate the secondary conditions. The length of a time unit depends on the type of packaging system. Typical values are around 3 seconds for one unit.

In a first step A, the state variables are determined or measured. In a second step B, physically practical solutions are generated which, in a third step C, are checked for the secondary conditions. If the latter are not fulfilled, then step B is repeated. If the secondary conditions are fulfilled then, in a fourth step D, the solution is assessed on the basis of the objective and stored in a fifth step E, the process being continued at step B. Once all the possibilities have been exhausted, then, in a sixth step F, the best solution is removed from the store and used as the control variable SV, in order to control the robots R1 to Rn and also the container conveyer until the next time unit.

In the following text, the individual steps will be explained in more detail:

In the second step B, physically possible solutions are generated. This is done, for example, by discretizing the possible robot outputs between 0 and a maximum output and generating all the possible combinations of the individual robot outputs. As FIG. 5 illustrates, the system is based on the principle of maintaining the mass of the products in each robot cell. FIG. 5 illustrates a plurality of successive cells, $y_{i-1}(k)$ piece goods being conveyed into the ith robot cell, $u_i(k)$ piece goods being put into the container by the robot, $y_i(k)$ piece goods leaving the ith robot cell again. Also illustrated is the hole stream, that is to say the free spaces in the containers. $z_{i-1}(k)$ holes pass into the ith robot cell, $z_i(k)$ leave it again. b is the hole stream which enters the system at the start. Therefore, on the one hand, the following is true of the maintenance of mass for the piece goods, which is represented in a first system of equations, the mass maintenance system of equations:

$$y_{i+1}(k+1)=y_i(k)-u_{i+1}(k)$$

$$z_i(k+1)=z_{i-1}(k)-u_{i+1}(k)+\Delta b(k)$$

$$\Delta b(k)=b(k)-b(k-1)$$

On the other hand, for a system having n robot cells, at the time k in a second system of equations, the following is true, the time-discrete dynamic system of equations:

$$y_1(k+1)=p(k)-u_1(k)$$

$$Y_2(k+1)=y_1(k)-u_2(k)$$

$$y_i(k+1)=y_{i-1}(k)-u_i(k)$$

$$y_n(k+1)=y_{n-1}(k)-u_n(k)$$

$$z_1(k+1)=u_{n+1}(k)-u_1(k)$$

$$z_2(k+1)=z_1(k)-u_2(k)+u_{n+1}(k)-z_{n+1}(k)$$

$$z_i(k+1)=z_{i-1}(k)-u_i(k)+u_{n+1}(k)-z_{n+1}(k)$$

$$z_n(k+1)=z_{n-1}(k)-u_n(k)+u_{n+1}(k)-z_{n+1}(k)$$

$$z_{n+1}(k+1)=u_{n+1}(k)$$

Here, $u_{n+1}$ represents the hole stream which enters the system at the start. By selecting the speed of the container conveyer, the initial hole stream can be controlled. If the containers are arranged on the container conveyer at equal intervals, then the initial hole stream is linked linearly with the belt speed.

At the time k, it is therefore possible to calculate the variables u and to define the robot output, in order to define the state of the system unambiguously at the time k+1. The movement of the product stream from one robot cell to the next may be described by means of the equation $y_i(k+1)=y_{i-1}(k)-u_i(k)$.

This is similarly true for the hole stream.

Step C is preferably carried out in the form of a negative selection, in that a test is performed to see whether the secondary conditions are violated. If this is not the case, the method proceeds to the next step D.

In the fourth step D, the solution is assessed by using the objective. This can be achieved in an extremely wide range of formulations, such as by means of variance of the individual robot outputs or the sum of the difference of the individual robot outputs and the average of the outputs.

The steps B–D are preferably formulated as an optimization problem, which is solved by means of quadratic programming. In this case, use is preferably made of the Lemke algorithm or a generalized internal point method. The quality of a solution is assessed by means of a quadratic target function, and the secondary conditions result in a set of solutions restricted by linear equations. However, other algorithms can also be used for this purpose, for example dynamic or general nonlinear programming can be used.

Figure 6:
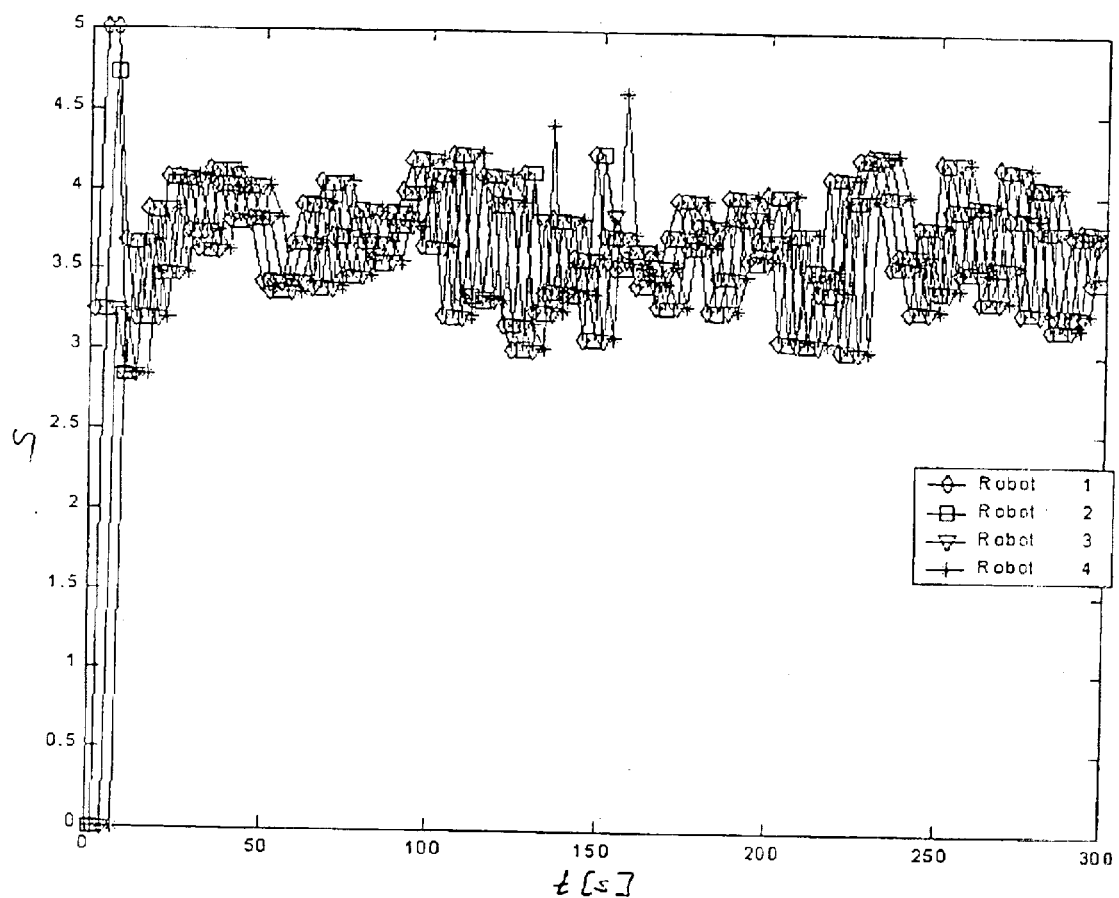

FIG. 6 illustrates how the individual robots are loaded in the method according to the invention. As can be seen in comparison with FIG. 1, the individual robots are utilized more uniformly, there are hardly any peaks any more, and all the robots are loaded approximately equally, none operating in the maximum output range.

| List of designations | |
|---|---|
| S | Piece goods |
| R1 - Rn | Robots |
| B | Containers |
| n | Natural number |
| 1 | Feed conveyer |
| 2 | Container conveyer |

-continued

| List of designations | |
|---|---|
| RS | Robot control system |
| SV | Control variable |
| O | Optical detection system |
| A | First step |
| B | Second step |
| C | Third step |
| D | Fourth step |
| E | Fifth step |
| F | Sixth step |

What is claimed is:

1. A method of filling containers with piece goods, the method comprising the steps of:
    a) feeding the piece goods on a feed conveyor to at least two robots arranged in the conveying direction, the piece goods laying in an arrangement on the feed conveyor;
    b) conveying containers on a container conveyor to said two robots, the containers having empty spaces;
    c) in a filling operation, putting the piece goods with said robots into said empty spaces, thereby controlling said robots in accordance with said arrangement of the piece goods on the feed conveyor and driving said robots in such a way that they are utilized at least approximately uniformly over time when putting the piece goods into said empty spaces;
    d) subdividing said filling operation into time units;
    e) determining state variables for each time unit;
    f) representing a maintenance of the number of piece goods during filling in a first system of equations;
    g) representing a dynamic behavior of said empty spaces and of said piece goods during a time unit in a second system of equations;
    h) introducing complete filling of said containers and utilization of all of said robots uniformly over time as boundary conditions;
    i) setting up a time-discrete dynamic system of equations; and
    j) determining best parameters for controlling said robots, said determination being made using optimization algorithms and taking into account said boundary conditions and said state variables.

2. The method as claimed in claim 1, further comprising the step of controlling a speed of said container conveyor in order to control the loading of the robots when putting the piece goods into said empty spaces.

3. The method as claimed in claim 1, further comprising quadratic programming for performing said optimization.

4. The method as claimed in claim 1, wherein state variables are used which comprise said arrangement, number and alignment of said piece goods on said feed conveyor and a maximum output of each of said robots.

5. A method of filling containers with piece goods, the method comprising the steps of:
    a) feeding the piece goods on a feed conveyor to at least two robots arranged in the conveying direction, the piece goods laying in an arrangement on the feed conveyor;
    b) conveying containers on a container conveyor to said two robots, the containers having empty spaces;
    c) in a filling operation, putting the piece goods with said robots into said empty spaces, thereby controlling said robots in accordance with said arrangement of the piece goods on the feed conveyor, said arrangement being a first condition, and driving said robots in such a way that they are utilized at least approximately uniformly over time when putting the piece goods into said empty spaces;
    d) subdividing the method into time units;
    e) determining state variables for each of said time unit;
    f) generating at least approximately all physically possible solutions for each of said units;
    g) checking secondary conditions;
    h) evaluating solutions by using an objective;
    i) comparing said solutions with one another;
    j) determining a best solution from the group of said solutions for each time unit; and
    k) using said best solution of a time unit as a control variable for controlling said robots in this time unit.

* * * * *